United States Patent [19]

Sircar et al.

[11] Patent Number: 4,971,606
[45] Date of Patent: Nov. 20, 1990

[54] CLOSED-LOOP THERMAL REGENERATION OF ADSORBENTS CONTAINING REACTIVE ADSORBATES

[75] Inventors: Shivaji Sircar, Wescosville; Roger R. Conrad, Trexlertown; William R. Koch, Fleetwood, all of Pa.

[73] Assignee: Air Products and Chemicals, Inc., Allentown, Pa.

[21] Appl. No.: 433,078

[22] Filed: Nov. 6, 1989

[51] Int. Cl.$^5$ .............................................. B01D 53/04
[52] U.S. Cl. .................................... 55/25; 55/28; 55/33; 55/59; 55/62; 55/68; 55/74; 55/75
[58] Field of Search ................ 55/25, 26, 31, 33, 58, 55/59, 62, 68, 75, 28

[56] References Cited

U.S. PATENT DOCUMENTS

| | | | |
|---|---|---|---|
| 3,313,091 | 4/1967 | Berlin | 55/75 X |
| 3,808,773 | 5/1974 | Reyhing et al. | 55/75 X |
| 3,816,975 | 6/1974 | Collins | 55/75 X |
| 3,864,452 | 2/1975 | Chi et al. | 55/75 X |
| 4,233,038 | 11/1980 | Tao | 55/75 X |
| 4,264,340 | 4/1981 | Sircar et al. | 55/25 |
| 4,314,828 | 2/1982 | Saito et al. | 55/33 X |
| 4,404,118 | 9/1983 | Herskovits | 55/75 X |
| 4,409,006 | 10/1983 | Mattia | 55/28 |
| 4,414,003 | 11/1983 | Blaudszun | 55/28 X |
| 4,421,532 | 12/1983 | Sacchetti et al. | 55/59 X |
| 4,472,178 | 9/1984 | Kumar et al. | 55/75 X |
| 4,477,267 | 10/1984 | Reiss | 55/75 X |
| 4,479,814 | 10/1984 | Oliker | 55/162 |
| 4,484,933 | 11/1984 | Cohen | 55/25 |
| 4,487,614 | 12/1984 | Yon | 55/75 X |
| 4,536,197 | 8/1985 | Cook | 55/28 |
| 4,557,736 | 12/1985 | Sircar et al. | 55/75 X |
| 4,636,225 | 1/1987 | Klein et al. | 55/59 X |
| 4,784,672 | 11/1988 | Sircar | 55/33 X |

Primary Examiner—Robert Spitzer
Attorney, Agent, or Firm—John M. Fernbacher; James C. Simmons

[57] ABSTRACT

A method is disclosed for the thermal regeneration of an adsorbent which contains adsorbed components which can react with and damage the adsorbent at regeneration temperatures. The method comprises passing a hot regeneration gas through a bed of the adsorbent at a sufficiently high flow rate such that the residence time and reaction of the desorbed components in the adsorbent bed are minimized. For removing water from CaX or SrX zeolites, the flow of nitrogen regeneration gas is controlled so that the nitrogen gas residence time in the bed is less than one second.

22 Claims, 3 Drawing Sheets

CLOSED-LOOP THERMAL REGENERATION OF ADSORBENTS CONTAINING REACTIVE ADSORBATES

TECHNICAL FIELD

The present invention is directed to the closed-loop thermal regeneration of adsorbents, and more particularly to a method for thermal regeneration of an adsorbent containing an adsorbate which can react with and damage the adsorbent at the regeneration temperature by controlling regeneration conditions to minimize such damage.

BACKGROUND OF THE INVENTION

The regeneration of adsorbents in many industrial gas adsorption processes is carried out by passing an inert purge gas through the adsorbate-laden adsorbent at an elevated temperature and near-atmospheric pressure. Adsorbed components are thus desorbed and removed from the system in a desorbate-laden effluent stream. In order to conserve purge gas, the desorbate-laden effluent stream can be treated to recover the desorbate, so that the clean gas can be recycled to the regeneration step. U.S. Pat. 4,479,814 discloses a recirculating thermal regeneration system in which hot purge gas is passed through a main adsorber containing spent adsorbent to desorb components adsorbed thereon, cooling the effluent stream and condensing the desorbed component(s), separating the condensed desorbed components, heating the purge stream to the regeneration temperature, passing the purge stream through an auxiliary adsorber, and recirculating the purge gas back to the adsorbent being regenerated. When the main adsorber regeneration is complete, heating is discontinued and the recirculating gas cools the main adsorber in preparation for the next adsorption step. During the cooling step, the auxiliary adsorber serves to remove residual desorbate from the purge gas entering the main adsorber. Adsorbed components removed during the regeneration step can include water or mixtures of $C_4$-$C_{10}$ petroleum fractions.

A closed-loop process for regenerating an adsorbent used in drying a feed gas stream containing greater than 1 ppm water is disclosed in U.S. Pat. No. 4,484,933. A heated purge gas is passed countercurrently through a main bed of spent adsorbent to desorb water, and the purge effluent is cooled to condense water. The purge gas then is passed through an auxiliary adsorber to remove residual water, heated, and returned to the main adsorbent bed. When the main adsorbent bed is sufficiently regenerated, the purge gas flow through the bed is reversed and cool purge gas passes through the bed to cool the bed in preparation for its next adsorption step. Hot gas from the main bed is passed through the auxiliary adsorber to desorb water, and the effluent gas is then cooled to condense water. The purge gas is then returned to the main adsorbent bed until the bed reaches the desired temperature, and the bed is then returned to adsorption service to dry the feed gas stream. Alternately, water-laden purge gas can be vented and makeup purge gas can be used for cooling the main adsorbent bed.

U.S. Pat. No. 4,536,197 discloses a closed-loop regeneration process in which heat stored during the cooling of a regenerated adsorbent bed is used in the regeneration of another spent adsorbent bed. In the process, a purge gas is heated by passing through a heat storage means, is passed through an auxiliary adsorber and main adsorber which removes a part of the adsorbed components from each adsorber, and is passed through a condenser to remove part of the desorbed components. Heated purge gas from the heat storage means is then passed through the main adsorber for further regeneration, and the auxiliary adsorber is allowed to cool. Finally, purge gas is passed in the opposite direction through the main adsorber, through the heat storage means which stores heat while the main adsorber cools, and through the auxiliary adsorber in which a part of the desorbed components from the main adsorber are adsorbed. Heat losses from the system are made up by an auxiliary heater.

Most inorganic adsorbents including zeolites, silica gels, and aluminas are highly hydrophilic, thus adsorbing water very strongly. In order to use such adsorbents in gas separation processes, adsorbed water must be removed to a high degree in order that the adsorption capacity of these adsorbents is satisfactory for gas separation applications. For certain types of zeolitic adsorbents, damage can occur during regeneration by irreversible chemical reaction between the adsorbent and desorbed components. For example, water-sensitive zeolites such as bivalent ion exchanged type A or X neolites containing water can be damaged during high temperature regeneration by hydrolysis reactions between desorbed water and the zeolite. In order to minimize adsorbent damage in such situations, regeneration must be accomplished at conditions such that these hydrolysis reactions are minimized.

SUMMARY OF THE INVENTION

A method is disclosed for the thermal regeneration of an adsorbent containing one or more adsorbed reactive components which can react with and damage the adsorbent during regeneration comprising passing at a regeneration temperature a regeneration gas which is essentially free of the reactive components through a bed of the adsorbent which initially contains the adsorbed reactive components at a temperature less than the regeneration temperature, whereby the adsorbed reactive components are desorbed, and withdrawing therefrom a purge effluent stream comprising desorbed reactive components and the inert regeneration gas, wherein the flow rate of the regeneration gas is controlled such that the gas residence time in the bed of adsorbent is less than about one second, whereby damage to said adsorbent by reaction with said reactive components at the regeneration temperature is minimized. Typically, the adsorbent is a calcium-exchanged type X zeolite or a strontium-exchanged type X zeolite, and the reactive adsorbed component is water. Preferably, nitrogen is used as the regeneration gas and the superambient temperature is between 200° and 800° F.

DETAILED DESCRIPTION OF THE INVENTION

The present invention is a closed-loop thermal regeneration method for regenerating adsorbents containing adsorbed components which can react with and damage the adsorbent at the high temperatures required for regeneration. Zeolite adsorbents in particular, such as bivalent ion-exchanged type A or type X zeolites, can be damaged by reactive desorbed components. Desorbed water at elevated regeneration temperatures can react with such zeolites to cause framework or cation hydrolysis. Adsorbed organic compounds when desorbed during regeneration can decompose by vapor-phase cracking and deposit carbon On the adsorbent. Ammonia at the elevated temperatures of regeneration can damage zeolites by animation of the zeolite framework. Strong acids such as HCl, or chelating agents such as EDTA, can damage zeolites at high temperatures by de-alumination.

Figure 1:
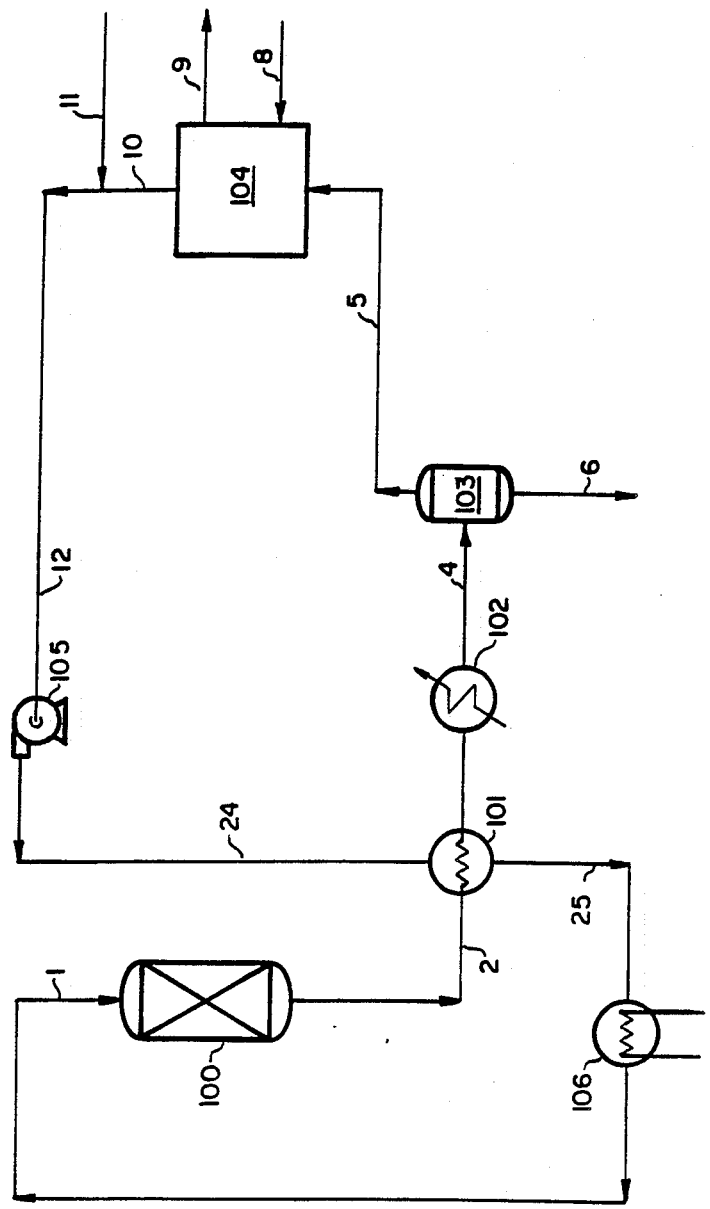
FIG. 1 is a schematic flow diagram of the adsorbent regeneration process of the present invention.

A first embodiment of the present invention discloses a method for removing adsorbed water from zeolitic adsorbents. Referring now to FIG. 1, adsorber 100 contains a water-laden adsorbent initially at ambient temperature and pressure. The regeneration process begins by admitting regeneration hot gas stream 1 at a temperature of about 200° to 800° F. into adsorber 100 and passing the gas through the adsorber thus heating the adsorbent and desorbing water. The residence time of the regeneration gas is controlled at about one second or less to minimize the harmful reaction of desorbed water with the zeolitic adsorbent as will be discussed in more detail below. This reaction can damage the adsorbent such that the adsorption capacity for reversibly adsorbed components is reduced. The regeneration gas can be any gas which is essentially free of water and which neither reacts with nor is significantly adsorbed by the adsorbent at regeneration conditions. Nitrogen is an effective gas for this purpose; dry air or other economically feasible gases can also be used.

Regeneration purge effluent stream 2 containing desorbed water is cooled by indirect heat exchange in exchanger 101 with a cool stream of recirculating regeneration gas. The partially cooled stream is further cooled in cooler 102, and the cooled stream 4 which now contains condensed water passes into separator 103 and the condensed water is removed as stream 6. The regeneration gas stream 5, now significantly depleted in water, passes into cyclic adsorption system 104 where essentially all remaining water is removed by selective adsorption. The adsorbent and the thermal regeneration conditions of cyclic adsorption system 104 are selected such that damage to the adsorbent due to reaction with water at the regeneration temperature does not occur, and optionally such that higher regeneration temperatures compared with those used in regenerating adsorber 100 can be used to minimize the required volume of regeneration gas stream 8 for system 104. Water-laden regeneration gas effluent stream 9 from cyclic adsorption system 104 is vented. Adsorption system 104 can be any known type of thermal swing adsorption system for drying gas streams. Such systems are well known in the art and generally operate to produce a gas product dew point as low as about −80° F. Alternately, adsorption system 104 can be a pressure swing adsorption system. Essentially water-free regeneration gas stream 10 is combined with makeup regeneration gas stream 11 if required, and the combined stream 12 is pressurized by blower 105 to yield pressurized regeneration gas stream 24. Stream 24 is heated in exchanger 101 by indirect heat exchange with hot regeneration gas stream 2, the heated stream 25 is further heated in heater 106, and hot regeneration gas stream 1 is recirculated to adsorber 100. Recirculation continues until the water content of regeneration gas effluent stream 2 reaches a predetermined level, typically a dew point of less than about −4° F. At this point, adsorber 100 is cooled to near ambient temperature. Cooling may be accomplished by discontinuing heating by heater 106 and continuing to recirculate regeneration gas until adsorber 100 is cooled to the adsorption temperature. The use of the regeneration gas recirculation system minimizes the high regeneration gas requirements which result from the necessarily high regeneration gas velocity through adsorber 100 in order to obtain a gas residence time of less than about one second.

Figure 2:
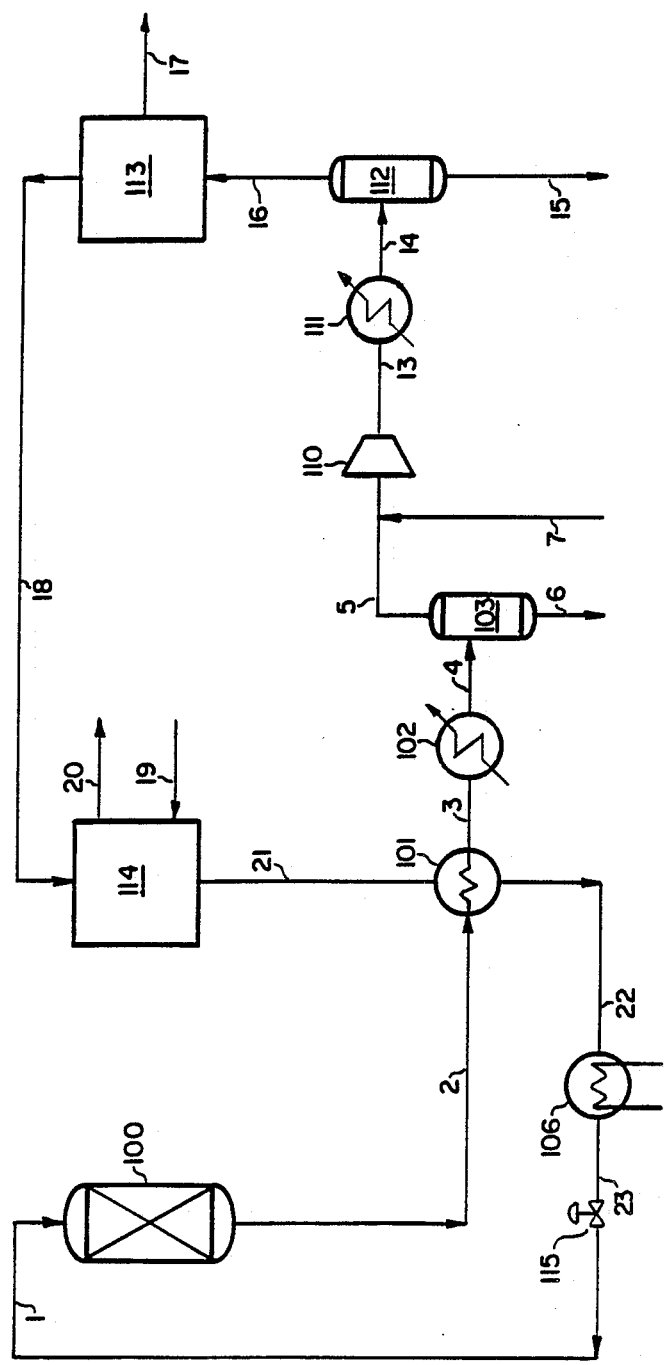
FIG. 2 is a schematic flow diagram of an alternate embodiment of the adsorbent regeneration process of the present invention.

A second embodiment of the present invention is shown in FIG. 2. Adsorber 100 contains a water-laden adsorbent initially at ambient temperature and pressure; the regeneration process begins by admitting hot regeneration gas stream 1 at a temperature between about 200° and 800° F., and passing the gas through the adsorber thus heating the adsorbent and desorbing water. The residence time of the regeneration gas is controlled at about one second or less to minimize the harmful reaction of desorbed water with the zeolitic adsorbent as will be discussed in more detail below. The regeneration gas can be any gas which is essentially free of water and which neither reacts with nor is significantly adsorbed by the adsorbent. Purge effluent stream 2 containing desorbed water is cooled by indirect heat exchange in exchanger 101 with a cool stream of recirculating regeneration gas, the partially cooled stream 3 is further cooled in cooler 102, and cooled stream 4 which now contains condensed water passes into separator 103 and condensed water is removed as stream 6. Stream 5, containing residual water vapor, is combined with regeneration gas makeup stream 7 and is compressed in compressor 110 to between 25 and 35 psig, and the compressed stream 13 is cooled in cooler 111. Regeneration gas makeup stream 7 typically would not have a stringent dew point requirement, since it is mixed with water-saturated stream 5, and the mixed stream is further dried. The regeneration gas in this case can be ambient air rather than dry nitrogen. Cooled gas stream 14, which contains additional condensed water, passes to separator 112 from which water stream 15 is removed, and gas stream 16 containing residual water passes into cyclic adsorption system 113, where a portion of the residual water is removed. Desorbed water is vented in purge stream 17. Adsorption system 113 can be any known adsorption system for drying gas streams, in which the adsorbent is regenerated by use of a dry regeneration gas, by thermal swing, by pressure swing, or known combinations thereof. An adsorption system suitable for this purpose is described for example in U.S. Pat. No. 4,264,340, the specification of which is incorporated herein by reference. Regeneration gas stream 18, now containing a low level of residual water typically with a dew point of −40° F. or above, passes into cyclic adsorption system 114 where essentially all remaining water is removed by selective adsorption. If adsorption system 113 is capable of producing a product gas stream having a dew point down to −80° F. adsorption system 114 is not needed. Adsorption system 114 is any type of temperature swing or pressure swing adsorptive drying system well-known in the art in which the adsorbent is regenerated by purging with a heated regeneration gas, followed by cooling and return to adsorption service. The adsorbent and the thermal regeneration conditions of cyclic adsorption system 114 are selected such that damage to the adsorbent due to reaction with water at regeneration temperatures does not occur, and optionally such that temperatures higher than those used in regenerating adsorber 100 can be used to minimize the volume of regeneration gas stream 19 required. Regeneration gas stream 19 is preferably vaporized liquid nitrogen with a dew point of about −80° F. Water-laden purge stream 20 is discharged from adsorption system 114 and vented. Regeneration gas stream 21, which is essentially free of water and has a dew point as low as −80° F., is heated by indirect heat exchange with hot purge gas stream 2 in exchanger 101. Heated regeneration stream 22 is further heated in heater 106, and heated purge stream 23 passes through control valve 115 to yield purge stream 1, which is recirculated to adsorber 100. Recirculation of hot regeneration gas is continued until the dew point of adsorber purge effluent stream 2 reaches a dew point of less than about −4° F. At this point, adsorber 100 is cooled to near ambient temperature. Cooling may be accomplished by discontinuing operation of heater 106 and continuing to recirculate regeneration gas until adsorber 100 is cooled sufficiently, usually to ambient temperature. The adsorbents used in adsorption systems 104, 113, and 114 can be selected from type 3A, 4A, 5A, and NaX zeolites, high silica sodium mordenite, silica gel, activated alumina, and activated carbon.

As earlier discussed, thermal regeneration of certain zeolites can result in damage if desorbed components react with the zeolites at the typical regeneration temperatures of 200° to 800° F. This damage results in reduced adsorption capacity for components reversibly adsorbed at temperatures less than the regeneration temperatures. When the rate of thermal desorption of a reactive component is faster than the rate of reaction of the component with the zeolite, the destructive reaction between the desorbed component and the zeolite can be reduced or eliminated by using a sufficiently high space velocity of heated regeneration gas to sweep the desorbed component from the zeolite bed before it can react with the zeolite.

Figure 3:
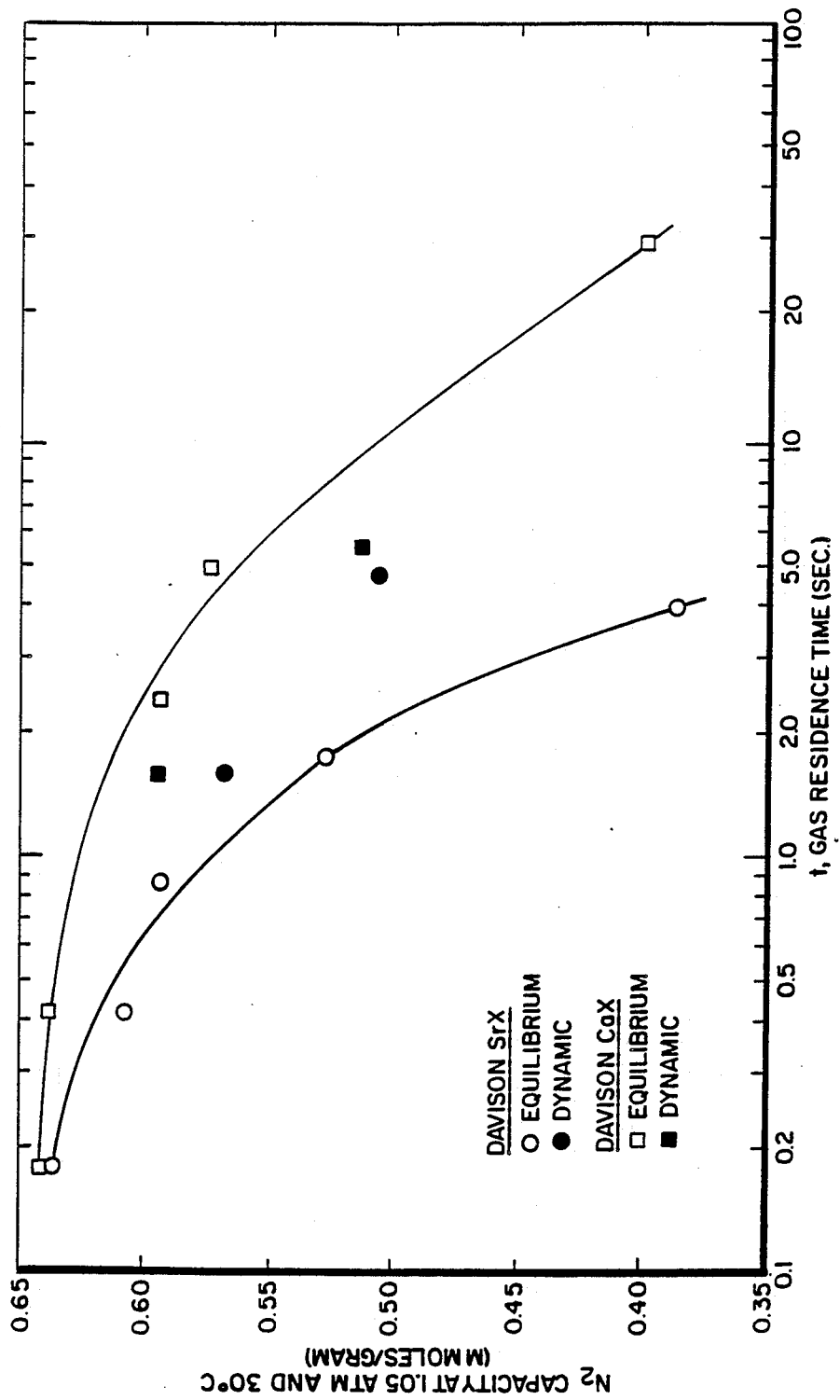
FIG. 3 is a plot of purge gas residence time for thermal regeneration vs. the nitrogen adsorption capacity of the regenerated adsorbent.

Strontium X and Calcium X zeolites can be used to recover nitrogen and oxygen from air by selective adsorption. Before these adsorbents can be used for nitrogen adsorption, residual water must be removed by thermal regeneration. Laboratory experiments were carried out to determine the effect of residence time of nitrogen as a regeneration gas at 400° C. on the nitrogen capacity at about atmospheric pressure and about 30° C. for SrX and CaX zeolites. Gas residence time, t, for these experiments is defined as $$t = Lde/G$$

where L is the length of the adsorber containing the zeolite, d is the gas density at 70° F. and atmospheric pressure, e is the void fraction of the adsorber and G is the mass flow rate of the regeneration gas per unit adsorber cross sectional area. FIG. 3 gives the results of these laboratory experiments, which show that at higher gas residence times during thermal regeneration the nitrogen adsorption capacities of the adsorbents at 30° C. and one atmosphere pressure decrease significantly. At very low gas residence times, for example, less than about 0.2 seconds, the nitrogen capacity of the regenerated adsorbent is about 0.64 mmols/gram and little adsorption capacity is lost during regeneration. Such low residence times can be impractical because of the high regeneration gas flow required. On the other hand, at high gas residence times, the nitrogen adsorption capacities of the regenerated adsorbents are reduced significantly due to reaction of desorbed water with the adsorbent during regeneration. A gas residence time of about one second or less is desired to minimize loss of adsorption capacity for nitrogen in this case. The lower limit of gas residence times will depend upon a number of engineering design factors for a given adsorber design, such as the type of adsorbent used, piping size, blower or compressor capacities, pressure drop limitations, and the like. Within these restrictions, it is desirable to operate at as low a regeneration gas residence time as practicable, but preferably not above about one second.

At the relatively high regeneration gas flow rates required for low gas residence times, for example less than about one second, regeneration gas recirculation is utilized to reduce regeneration gas consumption. Removal of water or other desorbed components from the recirculated purge gas is carried out economically by the adsorptive drying systems 104 of FIG. 1, and the system 113 and optionally system 114 of FIG. 2, as earlier described. Regeneration of these adsorption systems can be accomplished economically at high temperatures and lower regeneration gas velocities (higher gas residence times) by selecting adsorbents less prone to damage by reaction with water or other desorbed components than the more sensitive adsorbent being regenerated in the main adsorber 100. Alternately, the regeneration of cyclic adsorption systems 113 and 114 can be carried out by pressure swing using an adsorbent which does not react with water. The process of the present invention, in essence, thus removes water or other reactive adsorbed components from an adsorbent which is difficult to regenerate, and transfers these components by means of the recirculating purge gas to another adsorbent which is much easier to regenerate, thus greatly reducing the regeneration gas requirements while at the same time minimizing the loss of adsorbent capacity in the main adsorber 100 by regeneration at low gas residence times as earlier described.

EXAMPLE

Laboratory experiments, as earlier discussed, were carried out to determine the effect of regeneration gas residence time on adsorbent capacity for nitrogen. A highly calcium-exchanged type X zeolite and a highly strontium-exchanged type X zeolite, each having a particle size of 1/16″-⅛″, were used for the experiment. Both adsorbents are highly hydrophilic and at typical regeneration temperatures can react with water thus damaging the adsorbent structure by framework or cation hydrolysis. The test adsorbent was packed into a one inch diameter by four inch long tube and was heated to 400° C. while purging with dry nitrogen (−80° C. dew point) at various gas flow rates. Regeneration was continued until the exit gas dew point reached −40° C. and the adsorbent was cooled to room temperature. Nitrogen adsorption capacity was measured on each regenerated adsorbent at about 30° C. and one atmosphere absolute pressure by the usual constant volume adsorption method. In some cases, dynamic capacities were also measured by saturating the adsorbent with pure oxygen at one atmosphere and 30° C. and then flowing pure $N_2$ at that pressure and temperature through the adsorber until the effluent gas was pure $N_2$. The effluent $N_2$ gas composition was measured as a function of effluent gas volume and the $N_2$ capacity at these conditions was calculated by material balance. Results of the experiments are shown in FIG. 3, as earlier discussed, and show that the nitrogen capacities are significantly reduced at high regeneration gas residence times.

The regeneration process of the present invention can be integrated with existing adsorptive air separation systems such as those disclosed, for example, in U.S. Pat. Nos. 4,264,340, or 4,813,077, the specifications of which are incorporated herein by reference. In the embodiment illustrated in FIG. 2, adsorber 100 would be one of a plurality of adsorbers in such an adsorptive air separation system, each of which is charged with adsorbent containing adsorbed water which must be removed by regeneration to ensure the maximum adsorption capacity for nitrogen. Other equipment in such an adsorption air separation system would include compressor 110, cooler 111, separator 112, and cyclic adsorption system 113 of FIG. 2. Additional equipment needed for the embodiment of FIG. 2 would include heat exchanger 101, cooler 102, separator 103, heater 106, flow control valve 115, and cyclic adsorption system 114.

Other adsorbed components which can react with and damage adsorbents during regeneration, such as those components earlier discussed, will have different rates of reaction with the adsorbent during regeneration. The regeneration gas residence time required to minimize adsorbent damage will thus vary with the reactive properties of these components. It is generally desired that less than about 10% of the adsorption capacity at operating temperatures near ambient (between about 40° F. and 120° F.) for a selected reversibly-adsorbed component (for example nitrogen) be lost during regeneration, and the regeneration gas flow rate is controlled accordingly. The regeneration gas residence time is preferably less than one second.

Thus the present invention can be utilized to regenerate adsorbents at controlled conditions so that desorbed components do not react with and damage the adsorbent at the superambient temperatures required for proper regeneration.

A feature of the invention is that the gas residence time of the regeneration gas flowing through an adsorbent containing water is controlled at about one second or less to minimize damage to the adsorbent by reaction with desorbed water.

An advantage of the invention is that the amount of regeneration gas required at low gas residence times is minimized by recirculating the regeneration gas after removing the desorbed components in one or more cyclic adsorption systems which utilize regeneration conditions at which the adsorbents employed therein are not damaged by reaction with the desorbed components.

We claim:

1. A method for the thermal regeneration of an adsorbent containing one or more adsorbed reactive components which can react with and damage said adsorbent during regeneration comprising passing at a regeneration temperature a regeneration gas which is essentially free of said reactive components through a bed of said adsorbent which initially contains said adsorbed reactive components at a temperature less than said regeneration temperature whereby said adsorbed reactive components are desorbed, and withdrawing therefrom a purge effluent stream comprising desorbed reactive components and said inert regeneration gas, wherein the flow rate of said regeneration gas is controlled such that the gas residence time in said bed of adsorbent is less than about one second, whereby damage to said adsorbent by reaction with said reactive components at said regeneration temperature is minimized.

2. The method of claim 1 wherein said adsorbent is a bivalent ion-exchanged type A or type X zeolite.

3. The method of claim 2 wherein said adsorbent is a calcium-exchanged type X zeolite.

4. The method of claim 2 wherein said adsorbent is a strontium-exchanged type X zeolite.

5. The method of claim 1 wherein said regeneration temperature is between about 200° and 800° F. and said regeneration gas is nitrogen.

6. The method of claim 1 wherein said regeneration gas is air.

7. The method of claim 1 wherein less than about 10% of the adsorption capacity at ambient temperatures of a selected reversibly-adsorbed component is lost during regeneration.

8. The method of claim 1 wherein said desorbed reactive components comprise water.

9. The method of claim 8 wherein at least a portion of said water is removed from said purge effluent stream and the resulting stream is heated and recycled to said bed of adsorbent for use as said regeneration gas.

10. The method for claim 9 wherein said regeneration gas is passed through said bed of adsorbent until said purge effluent stream reaches a dew point of less than about −4° F.

11. The method of claim 9 wherein said water is removed by cooling said purge effluent stream and removing condensed water therefrom, and removing essentially all of the non-condensed water from said cooled purge effluent stream by adsorption in a cyclic adsorption system.

12. The method of claim 11 wherein said regeneration gas is passed through said bed of adsorbent until said purge effluent stream reaches a dew point of less than about −4° F.

13. The method of claim 11 wherein said cyclic adsorption system is a pressure swing adsorption system.

14. The method of claim 11 wherein said cyclic adsorption system is a temperature swing adsorption system.

15. The method of claim 14 wherein said temperature swing adsorption system contains an adsorbent selected from the group consisting of type 3A zeolite, type 4A zeolite, type 5A zeolite. NaX zeolite, high silica sodium mordenite, silica gel, activated alumina, and activated carbon.

16. The method of claim 14 wherein the product stream from said temperature swing adsorption system has a dew point of as low as −80° F.

17. The method of claim 9 wherein said water is removed from said purge effluent stream by cooling said stream and removing condensed water therefrom, compressing and cooling the resulting stream and removing additional condensed water therefrom, removing essentially all of the non-condensed water from the resulting cooled and compressed stream by a first cyclic adsorption system and reducing the pressure of the resulting stream prior to heating and recycling to said bed of adsorbent.

18. The method of claim 17 wherein the effluent stream from said first cyclic adsorption system is passed to a second cyclic adsorption system for the removal of additional water.

19. The method of claim 18 wherein said first and second cyclic adsorption systems are temperature swing adsorption systems.

20. The method of claim 19 wherein the adsorbents in said first and second cyclic adsorption systems are selected from the group consisting of type 3A zeolite, type 4A zeolite, type 5A zeolite, NaX zeolite, high silica sodium mordenite, silica gel, activated alumina, and activated carbon.

21. The method of claim 19 wherein the effluent stream from said first cyclic adsorption system has a dew point as low as $-40°$ F. and the product stream from the second cyclic adsorption system has a dew point as low as $-80°$ F.

22. The method of claim 17 wherein said second cyclic adsorption system is a pressure swing adsorption system.

* * * * *